(12) United States Patent
Singhee et al.

(10) Patent No.: US 8,290,761 B1
(45) Date of Patent: Oct. 16, 2012

(54) METHOD AND APPARATUS FOR RAPIDLY MODELING AND SIMULATING INTRA-DIE STATISTICAL VARIATIONS IN INTEGRATED CIRCUITS USING COMPRESSED PARAMETER MODELS

(75) Inventors: Amith Singhee, Yonkers, NY (US);
Sonia Singhal, Santa Clara, CA (US);
Rob A. Rutenbar, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 694 days.

(21) Appl. No.: 12/478,312

(22) Filed: Jun. 4, 2009

Related U.S. Application Data

(60) Provisional application No. 61/059,557, filed on Jun. 6, 2008.

(51) Int. Cl.
*G06F 17/50* (2006.01)
(52) U.S. Cl. ............................................ 703/14; 703/13
(58) Field of Classification Search ............... 703/13–14
See application file for complete search history.

(56) References Cited

U.S. PATENT DOCUMENTS

| 7,590,518 | B2 * | 9/2009 | Phillips | ............................ | 703/13 |
| 7,921,402 | B2 * | 4/2011 | He | ................................. | 716/136 |

OTHER PUBLICATIONS

Wu et al. "An Analytical Approach for Dynamic Range Estimation.", 2004 ACM. pp. 472-477.*
Xiong Jinjun et al., "Robust Extraction of Spatial Correlation," ISPD '06, Apr. 9-12, 2006, 8 pages.
Atkinson, Kendall E., "The Numerical Solution of Integral Equations of the Second Kind," Cambridge University Press, Jun. 28, 1997, pp. 3, 68-71.
Loéve, M., "Probability Theory II," 4th edition, Springer-Verlag, May 15, 1978, pp. 130-135, 143-146.
Visweswariah, C., et al., "First-Order Incremental Block-Based Statistical Timing Analysis," Proceedings of the 41st Annual Design Automation Conference (DAC 2004), San Diego, California, Jun. 7-11, 2004, pp. 331-336.
Ferzli, Imad A., et al., "Analysis and Verification of Power Grids Considering Process-Induced Leakage-Current Variations," IEEE Transactions on Computer-Aided Design of Integrated Circuits and Systems, vol. 25, No. 1, Jan. 2006, pp. 126-143.
Ghanem, Roger G., et al., "Stochastic Finite Elements: A Spectral Approach," Springer-Verlag, 1991, revised Aug. 7, 2003, pp. 20-23, 26-41.
Gupta, Puneet et al.,"Toward a Systematic-Variation Aware Timing Methodology," Proceedings of the 41st Annual Design Automation Conference (DAC 2004), San Diego, California, Jun. 7-11, 2004, pp. 321-326.

(Continued)

*Primary Examiner* — Eunhee Kim
(74) *Attorney, Agent, or Firm* — Withrow & Terranova, P.L.L.C.

(57) ABSTRACT

A method and system for rapidly modeling and simulating intra-die variations in an integrated circuit are disclosed. In one embodiment, each logic gate in an integrated circuit has a characteristic to be simulated, where the characteristic of the gate is a function of one or more parameters having intra-die variations. For each parameter, a model of intra-die variation of the parameter is generated such that a number of random variables in the model is compressed to a reduced number (r) of random variables based on a spatial correlation of the intra-die variation of the parameter. Then, using a Quasi Monte Carlo (QMC) technique, the integrated circuit is simulated based on the model of the intra-die variation of each of the one or more parameters.

26 Claims, 5 Drawing Sheets

OTHER PUBLICATIONS

Pelgrom, Marcel J.M., et al., "Matching Properties of MOS Transistors," IEEE Journal of Solid-State Circuits, vol. 24, No. 5, Oct. 1989. pp. 1433-1440.

Agarwal, Aseem et al., "Statistical Delay Computation Considering Spatial Correlations," Proceedings of the 2003 Asia and South Pacific Design Automation Conference (ASP-DAC 2003), Jan. 21-24, 2003, pp. 271-276.

Khandelwal, Vishal et al., "A General Framework for Accurate Statistical Timing Analysis Considering Correlations," Proceedings of the 42nd Annual Design Automation Conference (DAC 2005), Anaheim, California, Jun. 13-17, 2005. pp. 89-94.

Lee, Benjamin N., at al., "Refined Statistical Static Timing Analysis through Learning Spatial Delay Correlations," Proceedings of the 43rd Annual Design Automation Conference (DAC 2006), San Francisco, California, Jul. 24-28, 2006, pp. 149-154.

Liu, Frank, "A General Framework for Spatial Correlation Modeling in VLSI Design," Proceedings of the 44th Annual Design Automation Conference (DAC 2007), San Diego, California, Jun. 4-8, 2007, pp. 817-822.

Golub, G.H., et al., "Matrix Computations", 3rd edition, JHU Press, 1996, pp. 405-408.

Day et al., "On the convergence of Taylor series for functions of n variables," Math. Magazine, vol. 40 No. 5, Nov. 1967, pp. 258-260.

Rubenstein J. et al., "Signal delay in RC tree networks," IEEE Transactions on Computer-Aided Design of Integrated Circuits, CAD-2, Jul. 1983, pp. 202-211.

Cadwell et al., "Can recursive bisection alone produce routable placements?" DAC, 2000, pp. 477-482.

Shewchuk, et al., "Delaunay refinement algorithms for triangular mesh generation," Computational Geometry, vol. 22 No. 1-3, 2002, 46 pages.

Chang, H. et al.,"Statistical timing analysis under spatial correlations," DAC, 2005, pp. 1467-1482.

Bhardwaj, et al. "A framework for statistical timing analysis using non-linear delay and slew models," ICCAD, 2006, 6 pages.

Singhee, et al., "From finance to flip-flops: a study of fast quasi-Monte Carlo methods from computational finance applied to statistical circuit analysis," ISQED, 2007, 7 pages.

Singhee, "Novel algorithms for fast statistical analysis of scaled circuits" PhD Thesis, 2007, 265 pages.

Singhee, "Exploiting correlation kernels for efficient handling of intra-die spatial correlation, with application to statistical timing," 2008, 6 pages.

Chang, H. et al., Parameterized block-based statistical timing analysis with non-Gaussian parameters, nonlinear delay functions, DAC, 2005, pp. 71-76.

Singh, J. et al,"Statistical timing analysis with correlated non-Gaussian parameters using independent component analysis," DAC, 2006, pp. 155-160.

Ramalingam et al., "An accurate sparse matrix based framework for statistical static timing analysis," ICCAD, 2006, 6 pages.

Glasserman, "Monte Carlo methods in financial engineering," Springer, 2004, pp. 1-7; 43-45; 65-67; 86-87; 205-211; 293-303; 327-331.

Hane, M. et al., "Atomistic 3D process/device simulation considering gate line-edge roughness and poly-si random crystal orientation effects," IEDM, 2003.

Friedberg, P. et al, "Modeling within-die spatial correlation effects for process-design co-optmization," ISQED, 2005; 4 pages.

Fishman, G. S., "A first course in Monte Carlo," Duxbury, 2003, pp. 10-11.

McKay, M. D. et al., "A comparison of three methods for selecting values of input vairiables in the analysis of output from a computer code," Technometrics, vol. 21 No. 2, 1979; pp, 239-245.

Stein, M. "Large sample properties of simulations using Latin hypercube sampling," Technometrics, vol. 29 No. 2, 1987, pp. 143-151.

Hlawka, E., "Functionen von beschrankter variation in der theori der gleichverteilung," Annali de Matematica Pura ed Applicata, vol. 54, 1961, pp. 325-333.

Kiefer, J., "On large, deviations of the empirical d. f. of vector chance variables and a law of the iterated logarithm," Pacific J. Math. vol. 11, 1961, pp. 649-660.

Niederreiter, H. et al., "The algebraic geometric approach to low-discrepancy sequences," Monte Carlo and Quasi-Monte Carlo Methods 1996, Springer, 1998, pp. 137-160.

Wang, X. et al., "Low discrepancy sequences in high dimensions: how well are their projections distributed?" Journal of Computational and Applied Mathematics, 2007, 26 pages, dio: 1031016/j.cam.2007.01.005.

Owen, A. B., "Randomly permuted (t.m.s.)-nets and (t.s)-sequences," Monte Carlo and Quasi-Monte Carlo Methods in Scientific Computing, Springer, 1995, pp. 299-317.

Hong, H. S. et al, "Algorithm 823: implementing scrambled digital sequences," ACM Transactions on Mathematical Software, vol. 29 No. 2, 2003, pp. 95-109.

Kashyap, C. V. et al., "Closed-form expressions for extending step delay and slew metrics to ramp inputs for RC trees," IEEE Trans. CAD, vol. 23 No. 4, Apr. 2004. pp. 509-516.

Bakoglu, H. B., "Circuits, interconnections, and packaging for VLSI," Addison-Wesley, 1990, pp. 202-204.

Li, X. et al., Projection-based performance modeling for inter/intra-die variations, ICCAD, 2005, 7 pages.

Hogg, R. V. et al., "Introduction to mathematical statistics," 3rd edition, MacMillan, 1971, pp. 182.

Mani, M. et al., "An efficient algorithm for statistical minimization of total power under timing yield constraints," IEEE/ACM DAC, 2005, pp. 305-314.

Hocevar, D. E. et al., "Study of variance reduction techniques for estimating circuit yields," IEEE Transactions on Computer-Aided Design of Integrated Circuits, vol. 2 No. 3, Jul. 1983.

Swidzinski, J. F. et al., "A novel approach to efficient yield estimation for microwave integrated circuits," IEEE International Midwest Symposium on Circuits and Systems. Aug. 1999, pp. 367-370.

Frank, D. J. et al., "Monte Carlo modeling of threshold variation due to Dopant fluctuations," Symposium of VLSI Technology, 1999, pp. 169-170.

Papageorgiou, A. et al., "Beating Monte Carlo," Risk, 1996, 3 pages.

Sobol, I. M., "The distribution of points in a cube and the approximate evaluation of integrals," USSR Computational Mathematics and Mathematical Physics, vol. 7 No. 4, 1967, pp. 86-112.

Faure, H., Descrepance de suites associees a un systeme de numeration (en dimension s), Acta Arithmetica, vol. 41, 1982, pp. 51-70.

Niederreiter, H., "Low-discrepancy and low-dispersion sequences," Journal of Number Theory, vol. 30, 1988, vol. 30.

Acworth, P. et al., "A comparison of some Monte Carlo and quasi-Monte Carlo techniques for option pricing," Monte Carlo and Quasi-Monte Carlo Methods, 1996, pp. 1-18.

Bratley, B. L. et al., "Algorthim 659: implementing Sobol's Quasirandom Sequence Generator," ACM Transactions on Mathematical Software, vol. 14 No. 1, 1988, pp. 88-100.

Joe, S. et el., "Remark on Algorithm 659: implementing Sobol's Quasirandom Sequence Generator," ACM Transactions on Mathematical Software, vol. 29 No. 1, 2003, pp. 49-57.

Ninomiya, S. et al., "Toward real-time pricing of complex financial derivatives," Applied Mathematical Finance, vol. 3 No. 1, 1996, pp. 1-20.

Caflisch, R. E. at al., "Valuation of mortgage backed securities using Brownian Bridges to reduce effective dimension," Journal of Computational Finance, 1997, pp. 27-46.

Wang, X. et al., "The effective dimension and quasi-Monte Carlo integration," Journal of Complexity, vol. 19, 2003, pp. 101-124.

Hickernell, F. J., "A generalized descrepancy and quadrature error bound," Journal of Computational Mathematics vol. 67, 1998, pp. 299-322.

Owen, A. B., "Variance with alternative scramblings," ACM: Transactions on Modeling and Computer Simulation, vol. 13 No. 4, 2003. pp. 363-378.

Okten, G. et al., "Randomized quasi-Monte Carlo methods in pricing securities," Journal of Economic Dynamics and Control, vol. 28 No. 12, 2004, pp. 2399-2426.

Matsumoto, M. et al., "Twisted GFSR Generators II," ACM: Transactions on Modeling and Computer Simulation, vol. 4, 1994, pp. 254-266.

Tezuka, S., "Uniform random numbers: theory and practice," Kluwer, 1995, pp. 1-6; 150-160.

Banba, H. et al., "A CMOS bandgap reference circuit with sub-1-V operation," IEEE Journal of Solid State Cir., vol. 34 No. 5, 1999, pp. 670-674.

Johns, D. et al., "Analog integrated circuit design," Wiley, 1995, pp. 240-243.

Cao et al., "Predictive Technology Model," website, Nov. 15, 2008, 10 pages.

Peterson, W.W. et al., "Error-correcting codes," 2nd edition, MIT Press, 1972. pp. 156-157.

Noether, G. E., "Introduction to Statistics: the nonparametric way," Springer,1990. pp. 236-237.

Niederreiter "Random number generation and quasi-Monte Carlo methods," SIAM, 1992, pp. 13-15; 47-48.

Chung, K. L., "An estimate concerning the Kolmogoroff limit distribution," Transactions of the American Mathematical Society, col. 67, 1949, pp. 36-50.

Halton, J. H., "On the efficiency of certain quasi-random sequences of point in evaluating multi-dimensional integrals," Nureshe Mathematik, vol. 2, 1960, pp. 84-90.

* cited by examiner

METHOD AND APPARATUS FOR RAPIDLY MODELING AND SIMULATING INTRA-DIE STATISTICAL VARIATIONS IN INTEGRATED CIRCUITS USING COMPRESSED PARAMETER MODELS

RELATED APPLICATIONS

This application claims the benefit of provisional patent application Ser. No. 61/059,557, filed Jun. 6, 2008, the disclosure of which is hereby incorporated by reference in its entirety.

FIELD OF THE DISCLOSURE

The present disclosure relates to modeling and simulating intra-die variations in integrated circuits.

BACKGROUND

Manufacturing imperfections in the integrated circuit fabrication process result in undesired variations in the behavior of an integrated circuit from one die to another. These manufacturing or process variations can typically be classified into two types: global variations and intra-die variations. Global variations are variations from one die to another. In this case, the differences between transistors on the same die are as designed for the nominal case. For example, two transistors that are designed to be exactly identical will be identical on any one die, but all the transistors on a single die will shift together to some non-nominal process corner. In other words, the parameters of all the transistors within a single die are perfectly correlated. In the second case of intra-die variations, there is some independent variation from one transistor to another, resulting in partially correlated transistors on the same die. Furthermore, this correlation tends to be very high for neighboring transistors and decreases with the separating distance between any two transistors. As a result, this is spatially correlated intra-die variation. Typically all transistors within a single logic gate are assumed to be perfectly correlated, and this intra-die variation is modeled as inter-gate variation. In such a representation, if there are 1 million logic gates in an integrated chip, there will be 1 million random variables for each transistor parameter (e.g., channel length, threshold voltage, or the like).

Statistical static timing analysis (SSTA) is one critical application that has emerged as an essential tool for dealing with this statistical uncertainty in nanoscale designs. Prevailing SSTA methods, which are referred to as model based methods, typically exploit some simplifications to make the computation tractable. The most adopted implementations typically assume a linear dependence of gate delays (i.e., slew rates) on the statistical parameters (e.g., channel length, gate width, threshold voltage, or the like) for gates. This linear model enforces a severe approximation of the max( ) operator used to compute the worst case delay of any gate to maintain the linear dependence of the circuit delay on all statistical parameters. Early implementations also required the assumption of normally distributed statistical parameters. This leads to errors in the estimates of the circuit delay (or slack) distributions. Extensions to nonlinear gate models and/or non-normal distributions have been proposed. However, these extensions usually result in higher computation cost that might not scale cheaply with an increasing number of parameters, which is a trend expected for upcoming technologies. As a result, these extensions seem not to have yet found wide adoption in practice. Therefore, there is a need for a method and system for rapidly modeling and simulating intra-die variations in an integrated circuit.

SUMMARY OF THE DETAILED DESCRIPTION

A method and system for rapidly modeling and simulating intra-die variations in an integrated circuit are provided. In one embodiment, each logic gate in an integrated circuit has a characteristic to be simulated, where the characteristic of the gate is a function of one or more parameters having intra-die variations. For each parameter, a model of intra-die variation of the parameter is generated such that a number of random variables in the model is compressed to a reduced number (r) of random variables based on a spatial correlation of the intra-die variation of the parameter. In one embodiment, the model of the intra-die variation is a truncated Karhunen Loéve Expansion (KLE) of a function representing the intra-die variation of the parameter, wherein the KLE is truncated such that the number of random variables is compressed to the reduced number (r) of random variables. Then, using a Quasi Monte Carlo (QMC) technique, the integrated circuit is simulated based on the model of the intra-die variation of each of the one or more parameters.

In one embodiment, in order to simulate the integrated circuit using the QMC technique, values for the reduced number (r) of random variables are generated for each of the one or more parameters for one run of a simulation using a Low Discrepancy Sequence (LDS). Using the values generated for the reduced number (r) of random variables for the one or more parameters, values for the one or more parameters for all or a subset of the gates in the integrated circuit are calculated. Then, the run of the simulation of the integrated circuit is performed using the calculated values of the one or more parameters. This process is repeated for a desired number of runs of the simulation. Results of the simulation may then be output to a user or stored for subsequent use.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
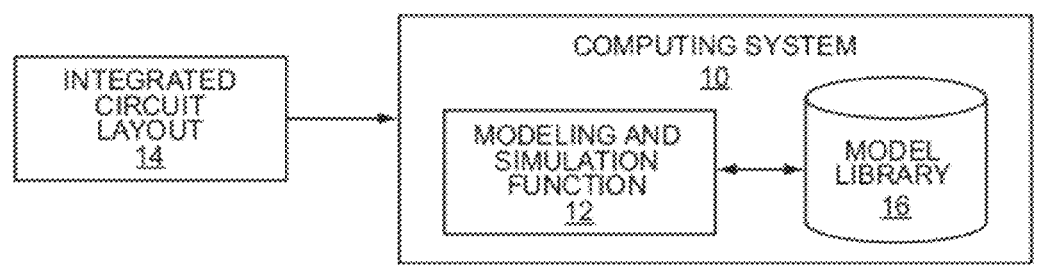
FIG. 1 illustrates a computing system incorporating a modeling and simulation function according to one embodiment of this disclosure.

FIG. 1 illustrates a computing system 10 incorporating a modeling and simulation function 12 that rapidly models and simulates intra-die variations in an integrated circuit according to one embodiment of this disclosure. The computing system 10 is a physical system such as, but not limited to, a personal computer. The modeling and simulation function 12 is preferably implemented in software and executed by a processor of the computing system 10. In general, the modeling and simulation function 12 obtains an integrated circuit layout 14 of an integrated circuit to be modeled and simulated. The manner in which the modeling and simulation function 12 obtains the integrated circuit layout 14 is not central to this disclosure. However, as an example, the integrated circuit layout 14 may be manually entered by a user using the modeling and simulation function 12. As another example, the integrated circuit layout 14 may be defined using a separate software application and stored in one or more digital files. In this case, the modeling and simulation function 12 may import the integrated circuit layout 14 from the one or more digital files storing the integrated circuit layout 14.

Once the modeling and simulation function 12 has obtained the integrated circuit layout 14, the modeling and simulation function 12 operates to simulate the integrated circuit defined by the integrated circuit layout 14 using models stored in a model library 16. In the preferred embodiment, the integrated circuit includes tens of thousands, hundreds of thousands, or millions of logic gates. The model library 16 includes a model for a characteristic (e.g., delay) of each of a number of gate types (e.g., NAND gates, NOR gates, and the like). For each gate type, the corresponding model defines the characteristic of the gate type as a function of a number of parameters including one or more parameters having intra-die variations. As discussed below, for each parameter of the one or more parameters having intra-die variations, the modeling and simulation function 12 operates to generate a model of the intra-die variation of the parameter. Then, using the models of the intra-die variations of the one or more parameters in combination with the models for the characteristic of the various gate types, the modeling and simulation function 12 is enabled to simulate the characteristic for all gates in the integrated circuit or a desired subset of the gates in the integrated circuit.

In one embodiment, the simulation is a Statistical Static Timing Analysis (SSTA) in which the modeling and simulation function 12 determines a statistical distribution of an input-to-output delay for one or more critical paths in the integrated circuit or for each path in the integrated circuit. The one or more critical paths may be the longest input-to-output paths or one or more critical paths defined by a user such as, for example, a designer of the integrated circuit. As will be appreciated by one of ordinary skill in the art, SSTA may be performed in order to determine a worst case maximum delay path within the integrated circuit, which in turn defines a maximum clock frequency that can be used to clock the integrated circuit. SSTA may also be performed to determine the minimum delay to ensure that data travels no faster than the clock period plus some necessary margin, which is referred to as "hold time."

Figure 2:
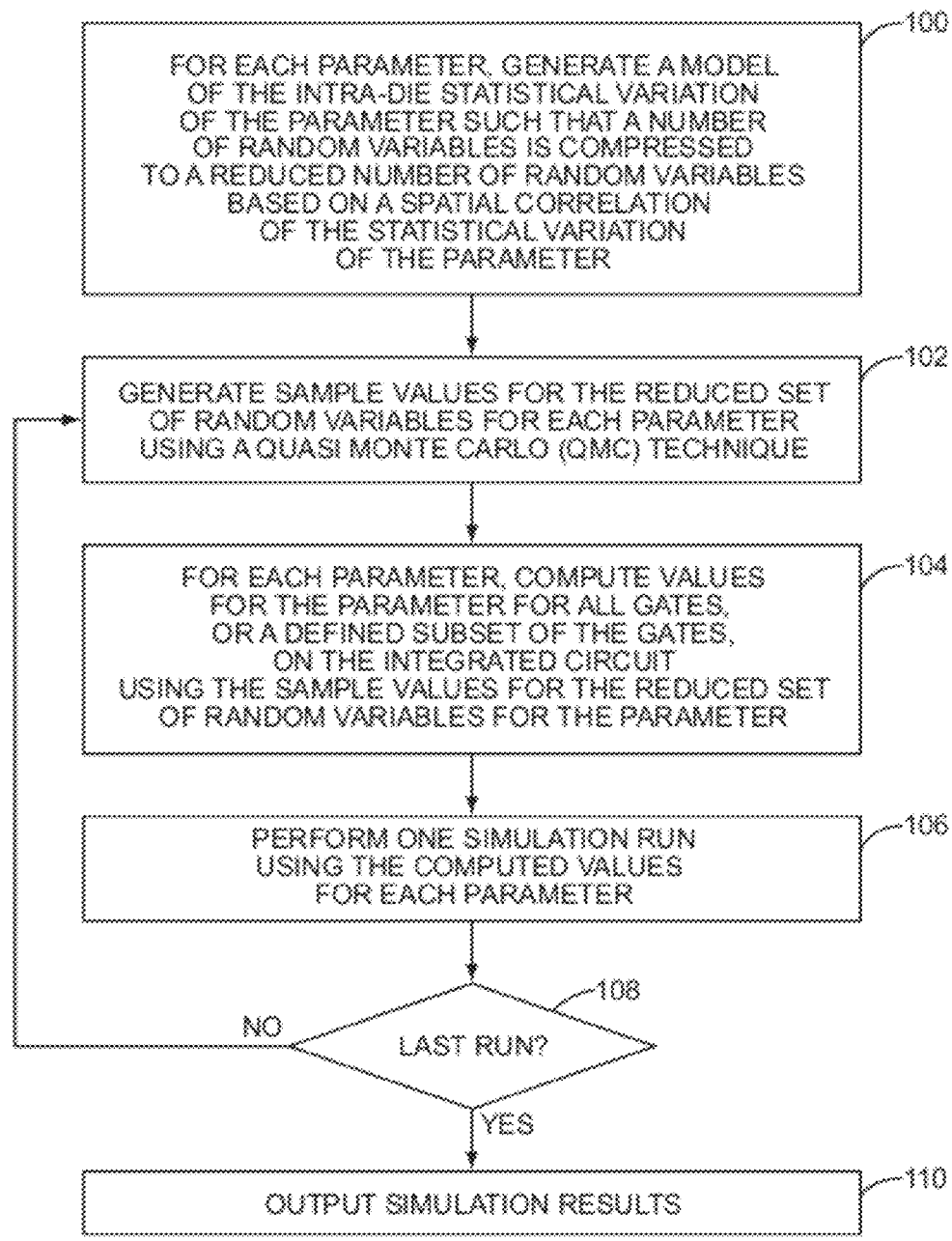
FIG. 2 is a flow chart illustrating the operation of the modeling and simulation function of FIG. 1 according to one embodiment of this disclosure.

FIG. 2 is a flow chart illustrating the operation of the modeling and simulation function 12 of FIG. 1 according to one embodiment of this disclosure. First, for each parameter (p) of one or more parameters having intra-die variations, a model of intra-die variation of the parameter (p) is generated such that a number of random variables in the model is compressed to a reduced number (r) of random variables based on a spatial correlation of the intra-die variation of the parameter (p) (step 100). The following discussion describes the generation of a model of the intra-die variation for one of the parameters (p). If there is more than one parameter (p) having intra-die variation, then this same process is used to generate the model of the intra-die variation for each of the parameters (p).

As a starting point, a grid-less stochastic process model for spatially correlated intra-die variations for each parameter (p) is used. This model does not rely on arbitrary partitioning of the chip area. Also, the spatial correlation of the intra-die variation of the parameter (p) is defined by a correlation kernel $K(x,y)$. The correlation kernel $K(x,y)$ is a known function that returns the covariance of the parameter (p) at locations x and y on the normalized chip area $D=[-1,1]\times[-1,1]$ $(x,y \in D)$. Note that different parameters (p) typically have different correlation kernels $K(x,y)$. Having normalized the parameters, the covariance is equal to the correlation. As such, $K(x,y)$ is referred to herein as a correlation kernel $K(x,y)$. While not essential, for a discussion of one exemplary technique for generating the correlation kernel $K(x,y)$, the interested reader is directed to J. Xiong, "Robust Extraction of Spatial Correlation," *IEEE Transactions on Computer-Aided Design of Integrated Circuits and Systems*, vol. 26, no. 4, pp. 619-631, April 2007, which is hereby incorporated herein by reference for its teachings relating to the generation of the correlation kernel $K(x,y)$.

The parameter (p) is represented as a 2-dimensional function $p(x)$, where $x \in D$. The values of $p(x)$ across the chip area, or domain (D), follow the correlation kernel $K(x,y)$. As such, $p(x)$ is a stochastic process with the correlation kernel $K(x,y)$. Using Karhunen Loéve Expansion (KLE), the parameter (p) can be represented by the following orthogonal decomposition:

$$p(x) = \sum_{j=1}^{\infty} \sqrt{\lambda_j}\, \xi_j f_j(x), \quad (1)$$

where $\lambda_j$ is the j-th largest eigenvalue of the correlation kernel $K(x,y)$ and $f_j(x)$ is the corresponding eigenfunction of the correlation kernel $K(x,y)$. The eigenvalues $\lambda_j$ and the eigenfunctions $f_j(x)$ are referred to as eigenpairs. $\xi_j$ is the j-th random variable. The eigenpairs $(\lambda_j, f_j)$ are solutions of the integral equation:

$$\int_D K(x,y) f(y) dy = \lambda f(x). \quad (2)$$

The eigenfunctions $f_j(x)$ are orthogonal and the random variables are uncorrelated for a Gaussian stochastic process.

Each location, or logic gate, within the integrated circuit die has a random variable $\xi_j$ for the parameter (p). In other words, without compression, the number of random variables $\xi_j$ is equal to the total number of logic gates on the integrated circuit, which can be hundreds of thousands or millions of logic gates in modern integrated circuits. From Equation (1), it can be seen that the j-th eigenvalue $\lambda_j$ is a measure of the contribution of the j-th random variable $\xi_j$ to the overall variance of p(x). Thus, in order to compress the number of random variables $\xi_j$, the KLE of p(x) shown in Equation (1) is truncated at the first r eigenpairs, where r is substantially less the total number of logic gates in the integrated circuit, in order to approximate the parameter (p) as:

$$p(x) \approx \sum_{j=1}^{r} \sqrt{\lambda_j}\, \xi_j f_j(x). \quad (3)$$

The approximation for the parameter (p) in Equation (3) is optimal in the sense that it minimizes the mean squared error resulting from a finite representation of the parameter (p). This implies that infinitely many random variables $\xi_j$ (j=1 ... ∞) spread over the domain (D), or chip area, can be represented using a potentially small number of uncorrelated random variables $\xi_j$ (j=1 ... r). For example, it has been found that, for ISCAS89 sequential benchmark circuits having 5,597 gates, using r=25 eigenpairs for each statistical parameter yielded errors of only 0.35% on average. This is a greater than 200× reduction in the number of random variables $\xi_j$. Note that the reduced number (r) may, in some embodiments, be variable such that an amount of error in the approximation of Equation (3) can be controlled. For example, the user operating the computing system 10 may be enabled to configure r or a maximum error.

In one embodiment, the value of r is in the range of 1<r<200 and is programmatically selected by the modeling and simulation function 12 such that:

$$\lambda_{200}(n-200) + \sum_{i=r+1}^{200} \lambda_i \leq 0.01 \sum_{i=1}^{r} \lambda_i, \quad (4)$$

where $\lambda_{200}$ is the 200-th eigenvalue and n is a total number of eignvalues. The left side of the inequality of Equation (4) is an upper bound on the sum of all unused n-r eigenvalues $\lambda$, given that only the first 200 eigenvalues $\lambda$ are computed. The inequality of Equation (4) states that the upper bound on the sum of all unused n-r eigenvalues $\lambda$ is less than 1% of the sum of the first r eigenvalues. By selecting a value for r in this manner, the truncated KLE of Equation (3) accounts for most of the variation in the parameter (p). It should be noted that both the inequality criterion, which is 1% in Equation (4), and the maximum value of r and thus the number of computed eigenvalues $\lambda$ may vary depending on the particular implementation. For example, in an implementation requiring greater accuracy, the inequality criterion may reduced from 1% to 0.5%, and the maximum value of r and the total number of computed eigenvalues $\lambda$ may also be increased to a point needed to satisfy the 0.5% inequality criterion.

In order to complete the model for the parameter (p) given in Equation (3), Equation (2) must be solved to compute the first r eigenpairs $(\lambda_j, f_j)$. These first r eigenpairs $(\lambda_j, f_j)$ can then be used to compute values for p(x) for any desired locations, or logic gates, on the integrated circuit die. The following discussion provides a preferred technique for solving Equation (2). However, the present invention is not limited thereto. Other techniques for solving Equation (2) may be used, as will be apparent to one of ordinary skill in the art upon reading this disclosure.

In the preferred embodiment, Equation (2) is solved using a Galerkin technique. Let $V_n$ be a finite-dimensional function space with a basis set $\{\Phi_i\}_{i=1}^{n}$ that is a subset of the (Hilbert) function space containing the solutions of Equation (2). Then, dropping the subscript j, any eigenfunction f(x) can be approximated as a linear combination of the basis functions $\phi_i$:

$$f(x) \approx f_n(x) = \sum_{i=1}^{n} d_i \phi_i(x). \quad (5)$$

Here, the subscript n indicates that an expansion in n basis functions $\phi_i$ is being used. The variable $d_i$ is the i-th element of eigenvector d. Note that bold letters are used herein to indicate vectors or matrices.

If Equation (5) is substituted into Equation (2), the two sides of the resulting equation will not match exactly, resulting in a residual R given by:

$$R_n(x) = \int_D K(x,y) f_n(y)\, dy - \lambda_n f_n(x). \quad (6)$$

Substituting Equation (5) into Equation (6) gives:

$$R_n(x) = \sum_{i=1}^{n} d_i \left\{ \int_D K(x,y)\phi_i(y)\, dy - \lambda_n \phi_i(x) \right\}, \quad (7)$$

where $\lambda_n$ and $d_i$ are all the unknowns that need to be computed, given the known set of basis functions $\phi_i$.

In order to estimate these unknowns, the residual R is minimized by making the residual R orthogonal to the basis:

$$\int_D R_n(x)\phi_i(x)\, dx = 0, \quad i=1,\ldots,n. \quad (8)$$

This ensures that the basis functions $\phi_i$ are completely utilized to "explain" as much of the true solution as possible using this finite-dimensional space $V_n$. Equation (8) can then be manipulated into matrix form:

$$Kd = \lambda_n \Phi d, \quad (9)$$

where $$K_{ik} = \int_D \int_D K(x,y)\phi_i(y)\phi_k(x)\, dx\, dy, \text{ and} \quad (10)$$

$$\Phi_{ik} = \int_D \phi_i(x)\phi_k(x)\, dx. \quad (11)$$

Equation (9) defines the well known Generalized Eigenvalue Problem (GEP), $\lambda_n$ being the eigenvalue and d being the eigenvector. Note that the j-th largest eigenvalue $\lambda_n$ and its corresponding eigenvector d approximate the j-th eigenpair $(\lambda_j, f_j)$ of Equation (2).

Since the basis functions $\phi_i$ and the correlation kernel K(x,y) are known, Equations (10) and (11) can be used to compute the values for $K_{ik}$ and $\Phi_{ik}$. Then, the GEP problem of Equation (9) can be solved to determine the first (i.e., largest) r eigenvalues $\lambda_n$ and corresponding eigenvectors d. Using Equation (4), the eigenvectors d can then be used to approximate corresponding eigenfunctions f(x).

Figure 3:
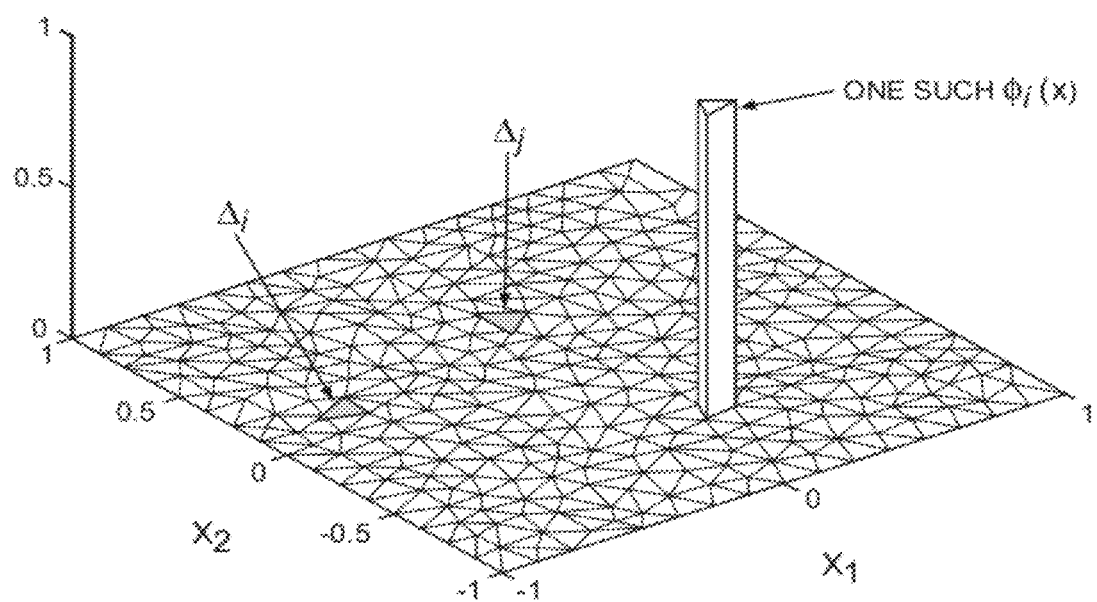
FIG. 3 illustrates a piece-wise constant triangular mesh basis function for use in solving for eigen-pairs according to one embodiment of this disclosure.

In one embodiment, the basis functions $\phi_i$ are piecewise constant over a triangular mesh (i.e., a triangulation of the chip area (D)):

$$\phi_i(x) = \begin{cases} 1, & x \in \Delta_i \\ 0, & x \notin \Delta_i, \end{cases} \quad (12)$$

where $\Delta_i$ are triangles with a maximum overlap of one side. FIG. 3 illustrates an example triangulation and one such basis function $\phi_i$. Then, defining the centroid of the i-th triangle $\Delta_i$ as $x_{\Delta i}$, and an area of the i-th triangle $\Delta_i$ as $a_{\Delta i}$, the Equations (10) and (11) can be rewritten as:

$$K_{ik} = \int_D \int_D K(x,y)\phi_i(y)\phi_k(x)\,dx\,dy \approx K(x_{\Delta i}, x_{\Delta k})a_i a_k, \text{ and} \quad (13)$$

$$\Phi_{ik} = \int_D \phi_i(x)\phi_k(x)\,dx \approx a_i. \quad (14)$$

Once the matrices K and $\Phi$ are computed using Equations (13) and (14), the GEP of Equation (9) can be solved and used in combination with Equation (4) to provide the first r eigenpairs $(\lambda_j, f_j)$. Then, using the first r eigenpairs $(\lambda_j, f_j)$, the truncated KLE of p(x) in Equation (3) provides a model of the intra-die variation of the parameter (p) that enables the parameter (p) to be computed for any location x (i.e., logic gate) on the integrated circuit die.

Once the model of the intra-die variation for each of the one or more parameters (p) has been generated, the modeling and simulation function 12 generates sample values for the reduced set of random variables $\xi_j$ for j=1 . . . r for each parameter (p) using a Quasi Monte Carlo (QMC) technique (step 102). Note that a standard Monte Carlo (MC) technique may alternatively be used. However, a QMC technique is preferable over a standard MC technique. More specifically, random sample values typically used for a standard MC technique suffer from clusters and empty spaces in their distribution over the sampling region (unit cube). In other words, the random sample values typically used for a standard MC technique are not very uniformly spread out, especially for smaller sample sizes. Although the details are outside the scope of this disclosure, this non-uniformity of any set of n points can be represented mathematically by a measure called star discrepancy $D^*_n$. The Koksma-Hlawka theorem shows that lower discrepancy sample sets can lead to lower Monte Carlo integration errors; specifically, the star discrepancy $D^*_n$ bounds the integration error. The discrepancy of n uniformly distributed random points in s dimensions is:

$$D^*_n|_{MC} = O(n^{-0.5}(\log \log n)^{-0.5}), \quad (15)$$

echoing the $O(n^{-0.5})$ convergence of the standard MC error.

Figure 4A:
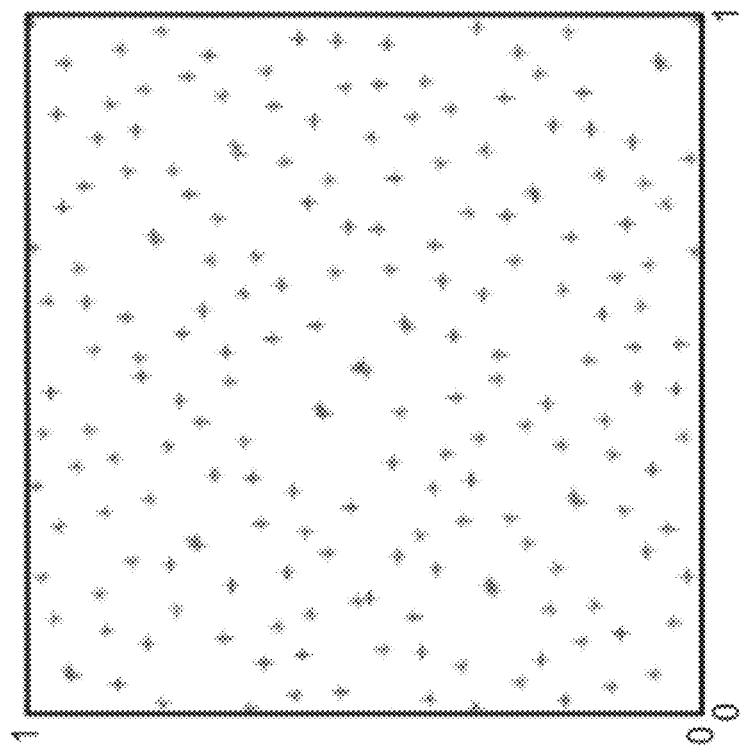
FIGS. 4A and 4B contrast the uniformity of samples generated for a standard Monte Carlo analysis and samples generated using Low Discrepancy Sequences (LDSs) for a Quasi Monte Carlo (QMC) analysis.
Figure 4B:
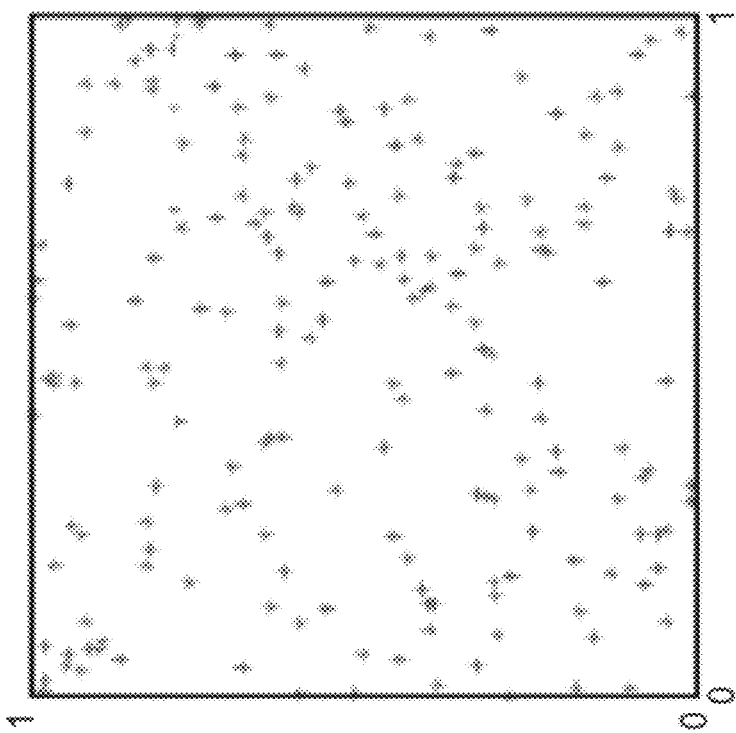

With respect to QMC, point sequences with asymptotically superior discrepancy exist:

$$D^*_n|_{QMC} = O(n^{-1}(\log^s n)^{-0.5}), \quad (16)$$

and are called Low Discrepancy Sequences (LDSs). Various types of LDSs are known. Some exemplary types of LDSs are Sobol' LDSs, Faure LDSs, Halton LDSs, Hammersley LDSs, Niederreiter LDSs, and van der Corput LDSs. The discrepancy behavior of LDSs suggests an asymptotic integration error rate of $O(n^{-1})$, which is much faster than the $O(n^{-0.5})$ of standard MC techniques. QMC techniques are Monte Carlo techniques that use samples from these deterministic LDSs rather than pseudo-randomly generated samples. FIGS. 4A and 4B illustrate pseudo-randomly generated points according to the standard MC technique and low-discrepancy points according to QMC, respectively. As shown, the low-discrepancy points of FIG. 4B are more uniformly distributed than the pseudo-randomly generated points of FIG. 4A.

One issue with LDSs is that for a large number of dimensions s, the number of points needed for uniformity in all dimensions can be large, which is reflected in Equation (16) where a large value of n is needed to make $\log^s n \ll n$. For practical sample sizes, this is manifested as undesirable patterns of empty regions in the low dimensional projections of the point set, which can lead to integration errors. However, current best LDSs, such as for example Sobol' LDSs, are able to achieve uniform filling in the early dimensions and suffer from patterns mainly in the projections of the later, or higher, dimensions. For example, a set of 10K Sobol' LDS points in 100 dimensions will have well distributed points in dimensions 1-10 and undesirable patterns in dimensions 91-100.

As such, with respect to step 102, in the preferred embodiment, the modeling and simulation function 12 generates sample values for the reduced set of random variables $\xi_j$ for j=1 . . . r for each of the one or more parameters using an LDS. In an embodiment where there is only one parameter (p), the modeling and simulation function 12 maps coordinates from the first dimension in the LDS to the first random variable $\xi_1$, coordinates from the second dimension in the LDS to the second random variable $\xi_2$, coordinates from the third dimension in the LDS to the third random variable $\xi_3$, and so on. In other words, for each random variable $\xi_j$, the modeling and simulation function 12 maps a point from the j-th lowest dimension of the LDS to the random variable $\xi_j$. As a result of this mapping, the early or low dimensions of the LDS are mapped to the most important random variables thereby providing better than standard MC convergence. Recall that the measure of importance of the random variables $\xi_j$ are the corresponding eigenvalues $\lambda_j$.

In an embodiment where there are multiple parameters (p), the modeling and simulation function 12 preferably interlaces the parameters (p) when mapping LDS points to the random variables for the parameters (p). For example, if there are two parameters W and L having random variables $\xi_{Wj}$ and $\xi_{L1}, \ldots, \xi_{Lj}$, respectively, the modeling and simulation function 12 may map the first coordinate in the LDS to $\xi_{W1}$, the second coordinate in the LDS to $\xi_{L1}$, the third coordinate in the LDS to $\xi_{W2}$, the fourth coordinate in the LDS to $\xi_{L2}$, and so on. In other words, if there are $N_P$ parameters $p_k$ (k=1, 2, . . . , $N_P$), this interlacing of the multiple parameters when mapping LDS coordinates to the random variables for the parameters may be represented as:

$$LDS_{INDEX}(j,k) = k + [N_P \cdot (j-1)], \quad (17)$$

where $LDS_{INDEX}$ is an index for the LDS sequence (i.e., a dimension of the LDS sequence). Therefore, the point in the $\{k+[N_P \cdot (j-1)]\}$-th dimension of the LDS sequence is mapped to the j-th random variable $\xi_j$ for the k-th parameter $p_k$.

Next, for each parameter (p), the modeling and simulation function 12 computes values for the parameter (p) for all gates on the integrated circuit, or a defined subset of the gates on the integrated circuit, using the sample values for the reduced set of random variables $\xi_j$ for j=1 . . . r for the parameter (p) (step 104). Then, using the values computed for the one or more parameters, the modeling and simulation function 12 performs one run of a simulation for the integrated circuit (step 106). The modeling and simulation function 12 then determines if it has performed a last run of the simulation (step 108). For example, the modeling and simulation function 12 may be configured to perform 1,000 runs of the simulation. As such, the modeling and simulation function 12 may determine whether the run of the simulation performed in step 106 was the 1,000-th run. If not, the process returns to step 102 and is repeated for the next run of the simulation.

Once the last run of the simulation has been performed, in this embodiment, the modeling and simulation function 12 outputs results of the simulation to a user (step 110). The results of the simulation may be, for example, a statistical distribution of the simulated characteristic of the integrated circuit. For example, if the simulated characteristic is a delay for all input-to-output paths in the integrated circuit or one or more critical input-to-output paths in the integrated circuit, the results output to the user may be a statistical distribution of the delay of each of the simulated input-to-output paths. Note, however, that the results output to the user may vary depending on the particular implementation.

Figure 5:
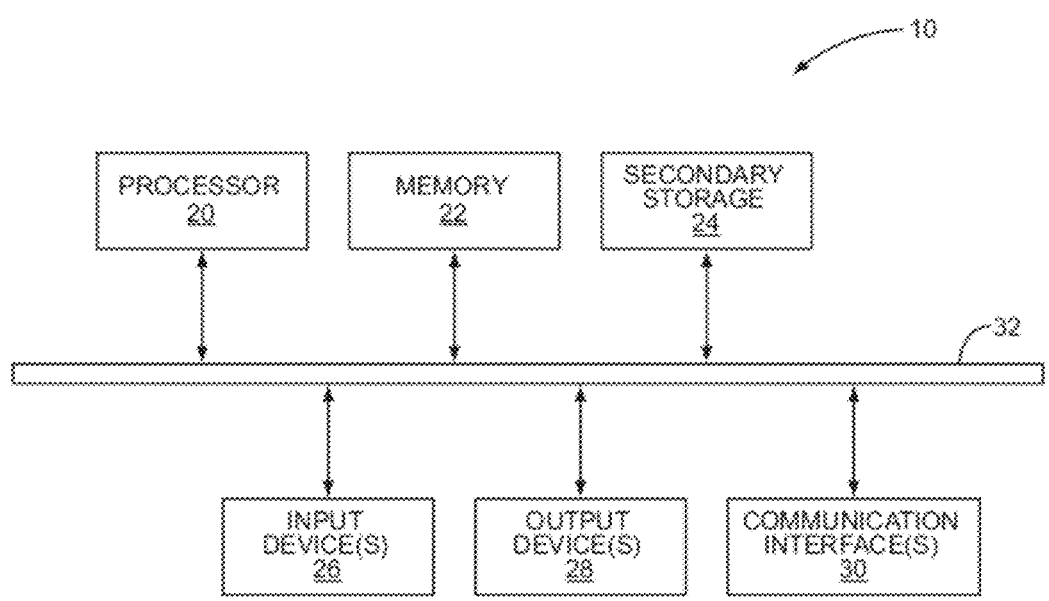
FIG. 5 is a block diagram of the computing system of FIG. 1 according to one embodiment of this disclosure.

FIG. 5 is a block diagram of the computing system 10 of FIG. 1 according to one embodiment of this disclosure. As illustrated, the computing system 10 includes a processor 20 having associated memory 22. The processor 20 may be a Central Processing Unit (CPU) such as a multi-core CPU. The memory 22 is non-volatile memory such as, for example, Random Access Memory (RAM). In the preferred embodiment, the modeling and simulation function 12 (FIG. 1) is implemented in software, stored in memory 22, and executed by the processor 20. However, the present invention is not limited thereto. For example, in an alternative embodiment, the processor 20 may be one or more Application Specific Integrated Circuits (ASICs) configured to provide the modeling and simulation function 12.

The computing system 10 may also include a secondary storage device 24 such as, for example, a hard disk drive, an optical storage device, flash memory, or the like. The secondary storage device 24 may be used to store, for example, the model library 16 (FIG. 1) or results of one or more simulations. The computing system 10 also includes one or more input devices 26 such as, for example, a keyboard and a mouse, and one or more output devices 28 such as a display. The computing system 10 may also include one or more communication interfaces 30 such as, for example, a wired or wireless Network Interface Card (NIC), a Universal Serial Bus (USB) interface, a Bluetooth interface, or the like. Lastly, the computing system 10 includes a bus 32 interconnecting the processor 20, memory 22, the secondary storage device 24, the one or more input devices 26, the one or more output devices 28, and the one or more communication interfaces 30.

The modeling and simulation function 12 provides a substantial improvement as compared to traditional modeling and simulation techniques for parameters having intra-die variation. In particular, for SSTA of the ISCAS89 circuits of the standard industry benchmark, it has been found that a few hundred, well-chosen sample points can achieve errors within 5%, with no assumptions on gate models, wire models, or the core Static Timing Analysis (STA) engine, with runtimes less than 90 seconds. This is 10×-100× faster than conventional Monte Carlo for statistical timing analysis, with none of the modeling restrictions required for traditional fast SSTA methods.

It should also be noted that while the discussion herein has focused on the modeling and simulation of integrated circuits having a number of logic gates, the present invention is not limited thereto. For example, the modeling and simulation function 12 may also be used to model and simulate integrated circuits including memory devices (e.g., Static Random Access Memory (SRAM)) having parameters with intra-die variation, integrated circuits including analog or Radio Frequency (RF) systems having active and/or passive devices with intra-die variation, or the like.

Those skilled in the art will recognize improvements and modifications to the embodiments of the present invention. All such improvements and modifications are considered within the scope of the concepts disclosed herein and the claims that follow.

What is claimed is:

1. A method of operating a computing system to model and simulate an integrated circuit, comprising:
for each parameter of one or more parameters that vary over an integrated circuit die, generating, by the computing system, a model of an intra-die variation of the parameter such that a number of random variables for the model is compressed to a reduced number (r) of random variables based on a spatial correlation of the intra-die variation of the parameter; and
for each run of a plurality of runs for a simulation for the integrated circuit:
generating, by the computing system, sample values for the reduced number of random variables for each of the one or more parameters using a Quasi-Monte Carlo (QMC) technique;
for each parameter of the one or more parameters, computing, by the computing system, values for the parameter for at least a subset of a plurality of locations on the integrated circuit die using the sample values for the reduced number (r) of random variables for the parameter and the model of the intra-die variation of the parameter; and
performing, by the computing system, the run for the simulation using the values computed for each parameter of the one or more parameters.

2. The method of claim 1 further comprising outputting, by the computing system, results of the simulation to a user of the computing system.

3. The method of claim 1 wherein, for each parameter of the one or more parameters, the number of random variables for the model of the intra-die variation of the parameter is compressed to the reduced number (r) of random variables using a Karhunen Loéve Expansion (KLE) technique.

4. The method of claim 3 wherein for each parameter, the model for the intra-die variation of the parameter is a truncated KLE.

5. The method of claim 4 wherein the truncated KLE is defined as:

$$p(x) \approx \sum_{j=1}^{r} \sqrt{\lambda_j}\, \xi_j f_j(x),$$

where x is a location on the integrated circuit die, p(x) represents the parameter as a function of location on the integrated circuit die, $\lambda_j$ is the j-th largest eigenvalue of a correlation kernel K(x,y) defining the spatial correlation of the intra-die variation of the parameter, $\xi_j$ is the j-th random variable, and $f_j(x)$ is the j-th eigenfunction corresponding to the j-th largest eigenvalue $\lambda_j$ of the correlation kernel K(x,y).

6. The method of claim 5 wherein the eigenfunctions $f_j(x)$ are orthogonal and the random variables $\xi_j$ are uncorrelated, and the eigenvalues $\lambda_j$ and the eigenfunctions $f_j(x)$ form eigenpairs $(\lambda_j, f_j)$ that are solutions of an integral equation defined as:

$$\int_D K(x,y)f(y)\,dy = \lambda f(x).$$

7. The method of claim 6 wherein for each parameter of the one or more parameters that vary over the integrated circuit die, generating the model of the intra-die variation of the parameter comprises solving the integral equation for the eigenpairs $(\lambda_j, f_j)$ for j=1 . . . r.

8. The method of claim 7 wherein solving the integral equation for the eigenpairs $(\lambda_j, f_j)$ for j=1 . . . r comprises solving the integral equation using a Galerkin technique.

9. The method of claim 7 wherein solving the integral equation for the eigenpairs $(\lambda_j, f_j)$ for j=1 . . . r comprises solving the integral equation using a Galerkin technique with a set of basis functions that are piecewise constant over a triangular mesh.

10. The method of claim 5 wherein the integrated circuit die comprises a number (N) of logic gates, and the reduced number (r) of random variables is substantially less than the number (N) of logic gates.

11. The method of claim 5 wherein a value for r is selected such that:

$$\lambda_{num\_computed}(n - num\_computed) + \sum_{i=r+1}^{num\_computed} \lambda_i \leq 0.01 \sum_{i=1}^{r} \lambda_i,$$

where num_computed is a number of eigenvalues $\lambda$ computed and n is a total number of eigenvalues $\lambda$.

12. The method of claim 5 wherein the one or more parameters consists of one parameter, and generating the sample values for the reduced number (r) of random variables for the one parameter using the QMC technique comprises mapping, for each random variable $\xi_j$, a point from the j-th lowest dimension of a Low Discrepancy Sequence (LDS) to the j-th random variable $\xi_j$.

13. The method of claim 5 wherein the one or more parameters consists of a plurality of parameters $(p_1, \ldots, p_k)$, and generating the sample values for the reduced number (r) of random variables for each of the plurality of parameters using the QMC technique comprises interlacing the plurality of parameters $(p_k; k=1, \ldots, N_P)$ when mapping points from a Low Discrepancy Sequence (LDS) to the reduced number (r) of random variables $(\xi_j; j=1, \ldots, r)$ for each of the plurality of parameters $(p_k)$ such that a point in a $\{k+[N_P \cdot (j-1)]\}$-th dimension of the LDS is mapped to the j-th random variable of the k-th parameter.

14. The method of claim 1 wherein generating the sample values for the reduced number (r) of random variables for each of the one or more parameters using the QMC technique comprises generating the sample values using a Low Discrepancy Sequence (LDS).

15. The method of claim 14 wherein generating the sample values using the LDS comprises mapping lower dimensions of the LDS to most important random variables of the reduced number (r) of random variables.

16. The method of claim 1 wherein the spatial correlation of the intra-die variation of each of the one or more parameters is defined by a different correlation kernel.

17. A non-transitory computer readable medium storing software adapted to instruct a processor of a computing system to:

for each parameter of one or more parameters that vary over an integrated circuit die, generate a model of an intra-die variation of the parameter such that a number of random variables for the model is compressed to a reduced number (r) of random variables based on a spatial correlation of the intra-die variation of the parameter; and for each run of a plurality of runs for a simulation for an integrated circuit:

generate sample values for the reduced number (r) of random variables for each of the one or more parameters using a Quasi-Monte Carlo (QMC) technique;

for each parameter of the one or more parameters, compute values for the parameter for at least a subset of a plurality of locations on the integrated circuit die using the sample values for the reduced number (r) of random variables for the parameter and the model of the intra-die variation of the parameter; and perform the run for the simulation using the values computed for each parameter of the one or more parameters.

18. The computer readable medium of claim 17 wherein the software is further adapted to instruct the processor of the computing system to output results of the simulation to a user of the computing system.

19. The computer readable medium of claim 17 wherein, for each parameter of the one or more parameters, the number of random variables for the model of the intra-die variation of the parameter is compressed to the reduced number (r) of random variables using a Karhunen Loéve Expansion (KLE) technique.

20. The computer readable medium of claim 19 wherein for each parameter, the model for the intra-die variation of the parameter is a truncated KLE.

21. The computer readable medium of claim 20 wherein the truncated KLE is defined as:

$$p(x) \approx \sum_{j=1}^{r} \sqrt{\lambda_j}\, \xi_j f_j(x),$$

where x is a location on the integrated circuit die, p(x) represents the parameter as a function of location on the integrated circuit die, $\lambda_j$ is the j-th largest eigenvalue of a correlation kernel K(x,y) defining the spatial correlation of the intra-die variation of the parameter, $\xi_j$ is the j-th random variable, and $f_j(x)$ is the j-th eigenfunction corresponding to the j-th largest eigenvalue $\lambda_j$ of the correlation kernel K(x,y).

22. The computer readable medium of claim 21 wherein the integrated circuit die comprises a number (N) of logic gates, and the reduced number (r) of random variables is substantially less than the number (N) of logic gates.

23. The computer readable medium of claim 21 wherein a value for r is selected such that:

$$\lambda_{num\_computed}(n - num\_computed) + \sum_{i=r+1}^{num\_computed} \lambda_i \leq 0.01 \sum_{i=1}^{r} \lambda_i,$$

where num_computed is a number of eigenvalues $\lambda$ computed and n is a total number of eigenvalues $\lambda$.

24. The computer readable medium of claim 17 wherein in order for the software to instruct the processor of the computing system to generate the sample values for the reduced number (r) of random variables for each of the one or more parameters using the QMC technique, the software is further adapted to instruct the processor of the computing system to generate the sample values using a Low Discrepancy Sequence (LDS).

25. The computer readable medium of claim 24 wherein in order for the software to instruct the processor of the computing system to generate the sample values using the LDS, the software is further adapted to instruct the processor of the computing system to map lower dimensions of the LDS to most important random variables of the reduced number (r) of random variables.

26. The computer readable medium of claim 17 wherein the spatial correlation of the intra-die variation of each of the one or more parameters is defined by a different correlation kernel.

* * * * *